United States Patent [19]

De Angelis et al.

[11] Patent Number: 5,142,673
[45] Date of Patent: Aug. 25, 1992

[54] BUS MONITOR WITH DUAL PORT MEMORY FOR STORING SELECTABLE TRIGGER PATTERNS

[75] Inventors: Douglas J. De Angelis, Woburn; Henry W. J. Maddox, Franklin; Arthur Peters, Sudbury; Donald J. Rathbun, Methuen; William L. Saltmarsh, Brockton, all of Mass.

[73] Assignee: Bull HN Information Systems Inc., Billerica, Mass.

[21] Appl. No.: 455,664

[22] Filed: Dec. 22, 1989

[51] Int. Cl.⁵ .............................................. G06F 11/34
[52] U.S. Cl. ................... 395/575; 364/267; 364/267.2
[58] Field of Search ............... 371/19, 15.1, 16.1; 364/200 MS File, 900 MS File

[56] References Cited

U.S. PATENT DOCUMENTS

| | | | |
|---|---|---|---|
| 3,707,725 | 12/1972 | Dellheim | 371/19 |
| 4,100,532 | 7/1978 | Farnback | 340/146.3 MA |
| 4,445,192 | 4/1984 | Haag et al. | 364/900 |
| 4,651,298 | 3/1987 | Currier, Jr. | 364/900 |
| 4,845,615 | 7/1989 | Blasciak | 364/200 |
| 4,937,740 | 7/1990 | Agawal et al. | 371/19 |
| 5,001,714 | 3/1991 | Stark et al. | 371/26 |

Primary Examiner—Jerry Smith
Assistant Examiner—Phung Mychung
Attorney, Agent, or Firm—Gary D. Clapp; John S. Solakian

[57] ABSTRACT

A monitor for selectively detecting and recording conditions at selected points within a system includes a trigger memory for storing patterns of trigger signals, wherein each pattern of trigger signals corresponds to a selected condition to be detected on first points of the system. The trigger memory includes a first port having a read address input connected from the first points and a data output connected to trigger output logic for providing patterns of trigger signals corresponding to the conditions to be detected. Each pattern of trigger signals is stored in the trigger memory location whose address corresponds to a pattern of signals from the first points representing the corresponding condition to be detected. The trigger memory is a dual port memory having a second port with a write address input and a data input for receiving trigger patterns to be stored therein. The method for generating the trigger patterns includes generating a first trigger pattern map and, from the first map, a second trigger pattern map to be written into a trigger memory which includes a plurality of submemories, wherein each submemory stores a portion of the trigger patterns.

6 Claims, 4 Drawing Sheets

BUS MONITOR WITH DUAL PORT MEMORY FOR STORING SELECTABLE TRIGGER PATTERNS

CROSS REFERENCES TO RELATED APPLICATIONS

The present patent application is related to copending United States Patents Applications Serial No. 07/455,666, filed Dec. 22, 1989, for Bus Monitor With Means For Selectively Capturing Trigger Conditions, by Douglas J. DeAngelis, Henry W. Maddox, Arthur Peters, Donald J. Rathbun and William L. Saltmarsh; Serial No. 07/455,668, filed Dec. 23, 1989, for Bus Monitor With Time Stamp Means For Independently Capturing And Correlating Events, by Douglas J. DeAngelis, Henry W. Maddox, Arthur Peters and Donald J. Rathbun; and Serial No. 07/455,667, filed Dec. 22, 1989, for Bus Monitor With Selective Capture Of Independently Occurring Events From Multiple Sources, by Douglas J. DeAngelis, Henry W. Maddox, Arthur Peters, Donald J. Rathbun and William L. Saltmarsh, which are filed concurrently with the present patent application and assigned to the assignee of the present patent application.

BACKGROUND OF THE INVENTION

1. Field of Use

The present invention relates to monitoring the operation of computer systems and, more particularly, to apparatus and methods for selecting and storing trigger patterns for detecting selected events in the operation of a computer system.

2. Prior Art

A recurring problem in monitoring the performance and operation of computer systems, for example, on a computer system bus during operation, is that of the ability of the user of a monitoring apparatus to select the conditions to be monitored and detected. The majority of system bus monitors of the prior art have detected events occurring in a system by means of combinatorial logic connected from either the points to be monitored, for example, the signal lines of a bus, or from the outputs of system circuits already present for detecting errors in the operation of the system, for example, parity checking circuits for detecting errors in the data communicated over a bus and timing circuits for detecting when a bus operation has failed to complete. The problem with such devices of the prior art is that the user of the apparatus has relatively little ability to select different, specific conditions to be detected. In addition, the selection process is usually quite cumbersome. For example, a system bus in a major system may contain eighty signal lines; there may therefore be up to $2^{80}$ different possible conditions of the bus to be monitored and the selection of conditions is often done by laboriously connecting input lines from the lines of the bus to the inputs of the combinatorial logic. In addition, and due to the complexity of the combinatorial logic necessary to identify and detect one or more single conditions of a large number of possible conditions, the user is often provided with logic circuits sufficient only to monitor for one or two conditions at a time.

SUMMARY OF THE INVENTION

The present invention provides a monitor means for selectively detecting and recording conditions at selected points within the system during operation. The monitor includes a trigger output means responsive to trigger signals for providing trigger outputs upon the occurrence of trigger signals corresponding to selected conditions upon first selected points and a recording memory means connected from second selected points and responsive to the trigger outputs for recording the conditions present at the second selected points. In particular, the present invention provides a trigger generating means connected from the first points and responsive to conditions thereon for selectively generating the trigger signals, and the method for using the trigger generating means.

The trigger generating means comprises a trigger memory for storing patterns of trigger signals, wherein each pattern of trigger signals corresponds to a selected condition to be detected on the first points. The trigger memory includes a first port having a read address input connected from the first plurality of points and a data output connected to the trigger output means for providing patterns of trigger signals corresponding to the bus conditions to be detected. Each pattern of trigger signals is stored in the trigger memory location whose address corresponds to a pattern of signals from the first points representing the corresponding condition to be detected.

In a preferred embodiment, the trigger memory is a dual port memory having a second port with a write address input and a data input and the system of the invention further comprises a pattern source means for generating write addresses for the trigger memory means and for providing trigger patterns to be written into the trigger memory means, wherein the trigger memory write address input and data input are connected from the pattern source means to receive and store the trigger pattern.

In further embodiment, the pattern source means is a memory for storing and providing preselected patterns of trigger signals and, in another, a processor.

The first selected points comprise the lines of a bus of the system and the pattern of signals from the bus represent conditions occurring on the bus.

In the method for using the trigger generating means of the present invention, a pattern of trigger signals is generated for each condition of the first selected points which is to cause the generation of a trigger signal. Each such pattern is written into the trigger memory through the second port of the trigger memory and at the location whose address corresponds to a pattern of signals from the first points representing the corresponding condition to be detected. Read addresses are then provided to the first port read address input of trigger memory, wherein the read addresses comprise the signals from the first plurality of points representing conditions occurring at the first plurality of points. The trigger patterns located at the addresses corresponding to the patterns of signals from the first points are read from the first port data output and provided to the trigger output means.

The invention further includes the method for generating the trigger patterns by generating a first trigger pattern map containing an entry row for each trigger signal to be generated. This process is performed by determining the condition from the first point whose occurrence is to indicated by the trigger signal, representing the trigger condition for that trigger signal as a Boolean product function containing terms representing the states of the signals from the first plurality of points, assigning a state, either true, not true or don't care, to each each term of the Boolean function, wherein the states of the terms define the condition to be indicated by the trigger signal, and writing the states of the Boolean function for the trigger signal into the corresponding row of the first map.

In a further aspect of the invention, the trigger memory is comprised of a plurality of submemories, wherein each submemory stores a portion of the trigger patterns. The method for generating the trigger patterns then comprises the further steps of generating a second trigger pattern map wherein the second map contains a block for each submemory and each block contains a column for each trigger pattern. This process is in turn comprised of the steps, for each trigger signal, of dividing the corresponding trigger pattern from the first map into a number of fields equal to the number of blocks in the second map wherein each field corresponds to a block of the second map, and for each field of the trigger pattern, determining the value of the field and writing a bit into the second map at the address location corresponding to that value in the block of the second map corresponding that the field and in the column of the second map corresponding to the trigger signal, and writing the trigger patterns of the blocks and columns of the second map into the corresponding locations in the submemories of the trigger memory means.

It is thereby an object of the present invention to provide an improved means for monitoring the operation of a system by providing an improved means for programmably selecting and generating trigger signals corresponding to conditions occurring at selected points in the system.

The foregoing and other objects, features and advantages of the present invention will be apparent from the following description of the invention and embodiments thereof, as illustrated in the accompanying figures, wherein:

DESCRIPTION OF PREFERRED EMBODIMENTS

A. General Description (FIG. 1)

Figure 1:
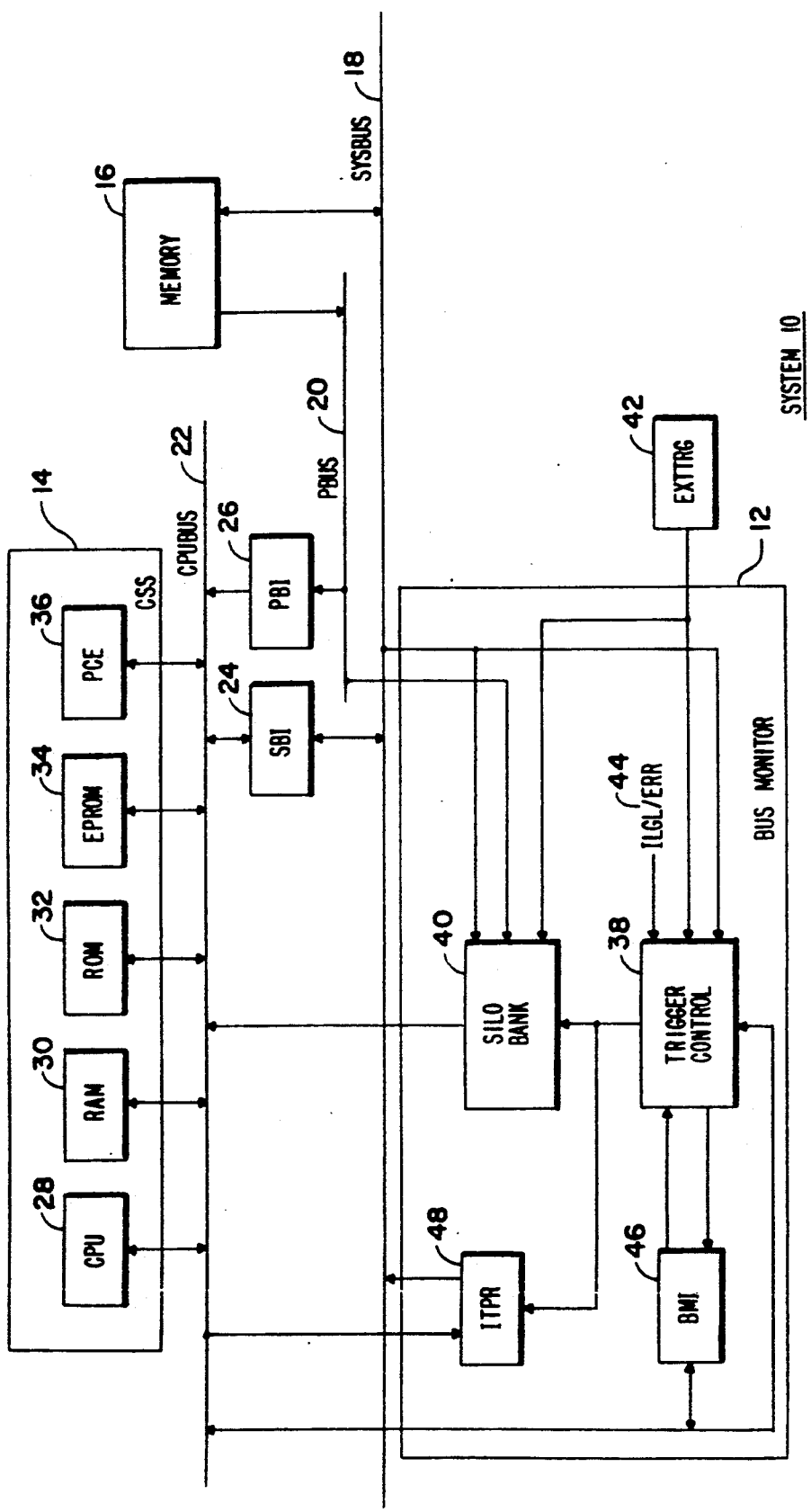
FIG. 1 is a block diagram of a system incorporating the bus monitor of the present invention.

Referring to FIG. 1, therein is represented a block diagram of an exemplary System 10 incorporating a Bus Monitor 12 of the present invention. As shown, System 10 includes at least one Central System 14, which performs information processing operations, and a Memory 16 for storing programs and data. CSS 14, Memory 16 and other elements of the system, such as other Central Systems and memories, and input and output controllers, through a System Bus (SYSBUS). System buses such as SYSBUS 18 are well known in the art and an example of such could be the MEGABUS* (*MEGABUS is a trademark of Bull HN Information Systems Inc.) used in Bull HN Information System's DPS6 and MRX computer systems.

In addition, System 10 includes a Private Bus (PBUS) which is connected between Memory 16 and CSS 14 and which is used solely to communicate information, that is, program instructions and data, from Memory 16 to CSS 14. While not a part of or a limitation of the present invention, PBUS 20 is representative of the special purpose buses often found in computer systems and, in System 10, is provided to enhance the speed with which information may be read from Memory 14 to CSS 12. In system 10, memory write operations are executed completely on SYSBUS 18 in the usual manner and certain memory read operations may be executed entirely through SYSBUS 18 in the usual manner. Many memory read operations, however, are of blocks of words, for example, of blocks of eight double words. In these block read operations, the read command and starting address of the block to be read are provided to Memory 16 through SYSBUS 18, in the usual manner for a read operation, and the block of words is then read from Memory 16 to CSS 14 through PBUS 20 as a burst of eight double words. The speed of the block read operation is thereby enhanced by avoiding the more complex and slower protocols used in communicating through general purpose SYSBUS 18.

As shown in FIG. 1, CSS 14 has associated with it a Central Processing Unit Bus (CPUBUS) 22 for communication among the elements of CSS 14 and SYSBUS 18 and PBUS 20 communicate with CPUBUS 22 through, respectively, a bidirectional SYSBUS Interface (SBI) 24 and a unidirectional PBUS Interface (PBI) 26.

CSS 14 is in turn comprised of a number of elements, including a Central Process Unit (CPU) 28 which, in the present embodiment of System 10, may be an Intel 80386 microprocessor, which is well known to those of ordinary skill in the art. CPUBUS 22 accordingly is a standard 32 bit 80386 bus using the 80 386 data, instruction and command formats and executing the 80386 bus protocols and procedures.

Associated with CPU 28 are a local Random Access Memory (RAM) 30 for use by CPU 28, such as storing data and instructions, a Read Only Memory (ROM) 32 used, for example, to store system boot programs, and an Erasable Programmable Read Only Memory (EPROM) 34 which is related to Bus Monitor 12 and will be discussed further below. Finally, CSS 14 includes a number of other CPU 28 related elements, generally referred to as Process and Communication Elements (PCE) 36, which may include such well known functions as interrupt handling logic and communications controllers, such as disk drive controllers and serial and parallel port controllers.

Referring now to Bus Monitor 12, as previously described, the function of Bus Monitor 12 is to continuously monitor the conditions present at a first set of selectable monitored points while System 10 is in operation. As will be described, those points include System 10's buses, most particularly SYSBUS 18, and may include Memory 16 and certain other selected points inside or outside System 10.

Should Bus Monitor 12 detect any of a number of preselected trigger conditions occurring at one or more of this first set of points, Bus Monitor 12 will generate a trigger output indicating the occurrence of that condition. Such a condition, or a selectable time sequence of such triggers, will cause the sampling and storing of the states then present at a second set of selectable sampled points for subsequent examination. As will be described, the second set of points may include some or all of the first set of points, such as the signals present on SYS-BUS 18, and may include further points in System 10, such as PBUS 20.

The major functional blocks of Bus Monitor 12 include a Trigger Control 38 and a Silo Bank 40. Trigger Control 38 has inputs comprising the first set of monitored conditions. As indicated, these Trigger Control 38 inputs are connected from SYSBUS 18, from selectable External Triggers (EXTTRG) 42, and from Illegal/Error Condition Triggers (ILGL/ERR) 44. As will be described, Trigger Control 38 is programmable to detect certain conditions, that is, combinations, patterns or sequences of states or signals occurring in the monitored inputs, and to generate corresponding trigger outputs indicating the detection of one or more of the programmably selected conditions. These triggers may be used directly to initiate the sampling of the conditions then present on the monitored points of System 10, or Trigger Control 38 may also be programmed to generate an output upon a selected time sequential occurrence of triggers.

Bus Monitor 12 is programmed through CSS 14 and, as shown, Trigger Control 38 is bidirectional connected to CPUBUS 22 through Bus Monitor Interfaces (BMI) 46. This connection allows CSS 14 to write selected trigger conditions into Trigger Control 38 and to read the state of Trigger Control 38.

Silo Bank 40 comprises the memory for storing, or recording, the sampled conditions present in System 10 when a trigger condition is detected by Trigger Control 38 and accordingly has a sample control input connected from Trigger Control 38. The data inputs of Silo Bank 40 are connected from the second set of selected sample points and include, as shown in FIG. 1, the data, command and address lines of SYSBUS 18, the lines of PBUS 20, the set of selectable external points from EXTTRG 42. As will be described, the sample inputs of Silo Bank 40 further include a time stamp generated by Trigger Control 38.

Silo Bank 40 in turn has data outputs connected to CPUBUS 22, so that the contents of Silo Bank 40 may be read to CSS 14 for examination or transfer to other destinations, such as a remote monitoring facility.

Finally, Bus Monitor 12 has a set of Interrupt/Pattern Programmable Registers (IPPR) 48 connected from CPUBUS 22 and to SYSBUS 18. In a first mode, IPPR 48 is used by CSS 14 to test SYSBUS 18 and system elements connected from SYSBUS 18 by allowing CSS 14 to write test patterns onto SYSBUS 18 through IPPR 48 under the control of CSS 14. In the bus monitor related mode, CSS 14 may write selected commands into IPPR 48, such as a system or CPU interrupt command, and store the command in IPPR 48 until the command is written onto SYSBUS 18 by the occurrence of a trigger output from Trigger Control 38.

Having described the overall structure and operation of a System 10 incorporating a Bus Monitor 12 of the present invention, and the general structure and operation of Bus Monitor 12, the following will describe Bus Monitor 12 in further detail.

Figure 2:
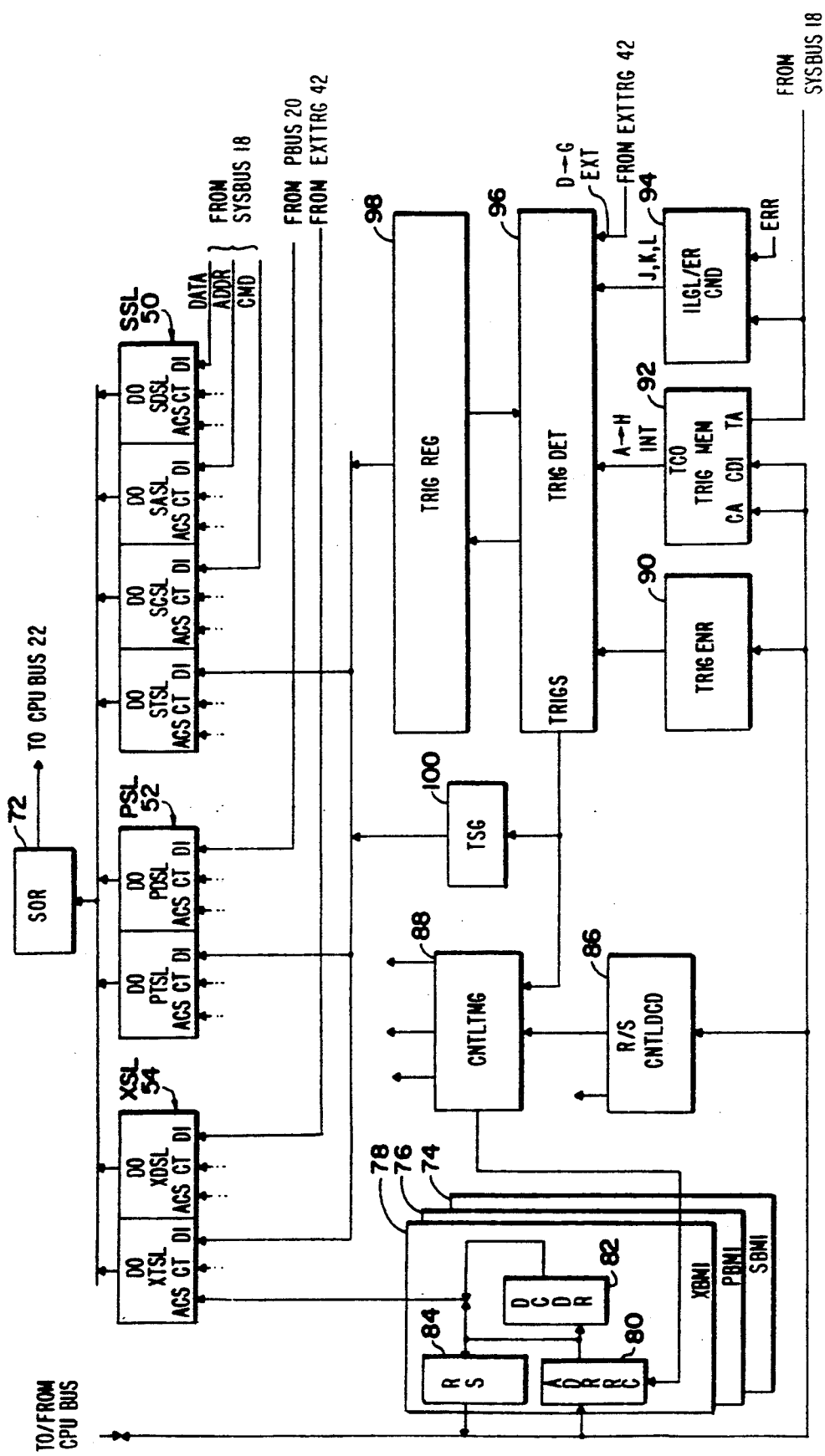
FIG. 2 is a block diagram of the bus monitor of the present invention.

B Bus Monitor 12 (FIG. 2)

B.1 Silo Bank 40

Referring to FIG. 2, therein is shown a more detailed block diagram of Bus Monitor 12, with the exception of IPPR 48.

Located across the top of FIG. 2 is Silo Bank 40 which, as shown, is comprised of three sub-silos, each corresponding to a point in System 10 whose condition, or state, is to be recorded upon the occurrence of a corresponding trigger output from Trigger Control 38. As shown, these sub-silos comprise a SYSBUS Silo (SSL) 50, a PBUS Silo (PSL) 52, and an External Trigger Silo (XSL) 54. Each of these sub-silos is in turn comprised of three silo segments, each segment being assigned to the recording of a particular set of conditions from the corresponding point in System 10. As shown, SSL 50 is comprised of a SYSBUS Data Silo (SDSL) 56, a SYSBUS Address Silo (SASL) 58, a SYSBUS Command Silo (SCSL) 60, and a SYSBUS Time Stamp Silo (STSL) 62. PSL 52 is comprised of a PBUS Data Silo (PDSL) 64 and a PBUS Time Stamp Silo (PTSL) 66 while XTSL 54 is comprised of an External Data Silo (XDSL) 68 and an External Time Stamp Silo (XTSL) 70.

SDSL 56, SASL 58, SCSL 60 and STSL 62 have data inputs connected from, respectively, the data, address and command lines of SYSBUS 18 and the output of a time stamp generator. PDSL 64 and PTSL 66 have data inputs connected from, respectively, the lines of PBUS 20 and the time stamp generator, while XDSL 68 and XTSL 70 have data inputs connected, respectively, from the external sample points, for example, EXTTRG 42, and, again, the time stamp generator. The data inputs of SSL 50, PSL 52 and XSL 54 are also connected, as described=bed further below, from Trigger Control 38, so that SSL 50, PSL 52 and XSL 54 may receive and store the triggers initiating the sampling operations, and information relating to the triggers initiating the sampling operations.

The data outputs (DOs) of SSL 50, PSL 52 and XSL 54 are, as shown, connected in parallel to the data inputs of Silo Output Register (SOR) 72 and the data outputs of SOR 72 are connected in turn to CPUBUS 22. As will be described further, CSS 14 may address and read the contents of any of SSL 50, PSL 52 or XSL 54 to CPUBUS 22 through SOR 72.

In the present embodiment of Bus Monitor 12, SSL 50, PSL 52 and XSL 54 are comprised of video RAMs (Random Access Memories), such as are used in personal computers to store and provide the video display outputs. As is known, video RAMs are comprised of two memory components, the first being a large, relatively slow dynamic memory used to store large volumes of information, such as graphics to be displayed on a display screen, and a smaller and much faster static memory. In normal use, data is written into the dynamic memory portion of a video RAM at a relatively low speed, is subsequently and selectively transferred into static memory portion of the RAM, and read from the static memory portion at a much higher speed, for example, to a graphics display unit. In Bus Monitor 12, however, data is read at high speed into the dynamic memory portion of the video RAM, thereby allowing high speed capture of information present on the monitored points of System 10, such as SYSBUS 18 and transferred into the much larger though slower memory comprised of the dynamic memory portion of the video RAM, from which it may be subsequently read at much lower speeds. The use of video RAMs for Silo Bank 40 thereby provides a memory unit having high speed write and data capture capabilities, in the static memory portion of the video RAM, combined with the high storage volume and low costs of the dynamic memory portion of the video RAM.

B.2 BMIs 46

Located in the lower left corner of FIG. 2 are BMIs 46 which, as shown, are comprise a SYSBUS BMI (SBMI) 74, a PBUS BMI (PBMI) 76, and an External BMI (XBMI) 78 which provide interfaces between CPUBUS 22 and, respectively, SSL 50, PSL 52 and XSL 54. SBMI 74, PBMI 76 and XBMI 78 are essentially identical and each includes an Address and Register Counter (ADRRC) 80 which has data inputs connected from CPUBUS 22 and a clock input connected from the read/write control and timing circuitry for Silo Bank 40. As will be described further, the ADRRC 80's generate and provide read and write addresses to Silo Bank 40 and may be loaded with addresses from CSS 14, for example, to select information to be read from Silo Bank 40 and to initialize the starting addresses at which sampled information is written into Silo Bank 40. The ADRRC 80 clock inputs from the read/write timing and control circuitry are primarily used to generate successive write addresses for writing sampled information into Silo Bank 40.

Each of SBMI 74, PBMI 76 and XBMI 78 also includes a Decode Register (DCDR) 82 connected from the outputs of the ADRRC 80 and which decodes the contents of the ADRRC 80s to generate, in the present implementation of Bus Monitor 12, the address and column select inputs to the memory elements of SSL 50, PSL 52 and XSL 54. Finally, each of SBMI 74, PBMI 76 and XBMI 78 also includes a Register Store (RS) 84 having data inputs connected from the outputs of the respective ADRRC 80s and data outputs connected to CPUBUS 22, so that the contents of the ADRRC 80s may be read to CSS 14 through CPUBUS 22.

B.3 Control and Timing, Register and Memory Elements

Adjacent to the BMIs 46 are two generalized control and timing elements, Register/Silo Control/Decode (RSCD) 86 and Control and Timing (CNTLTMG) 88, which was referred to just above in the description of the BMIs 46. These elements are primarily used to control the reading and writing of the registers of the BMIs 46, just described, the memory elements of SSL 50, PSL 52 and XSL 54, SOR 72 and other registers and memory elements of Bus Monitor 12 which will be described in detail further below. RSCD 86 is connected from CPUBUS 22 to receive and decode addresses and operations commands from CSS 14, such as the addresses and commands to write an address into a BMI 46 or to read information from an address in one or more of the elements of Silo Bank 40, and to provide the corresponding control outputs to the elements of Bus Monitor 12, including CNTLTMG 88. CNTLTMG 88, as its name implies, provides the detailed control and timing signals to the register and memory elements of Bus Monitor 12, in particular the memory elements of SSL 50, PSL 52 and XSL 54. As indicated, CNTLTMG 88 has an input from a Trigger output of the trigger detection logic, described in detail in the following, for the purpose of controlling the writing of data from the selected sample points into SSL 50, PSL 52 and XSL 54, and a time stamp, when, as previously described, Bus Monitor 12 detects a selected trigger condition. The design and operation of RSCD 86 and CNTLTMG 88 are conventional and determined at the detailed level by the operations of Bus Monitor 12, which will be described in detail in the following, and the particular circuits chosen for the individual register and memory elements of Bus Monitor 12. As such, and because the design of such as RSCD 86 and CNTLTMG 88 are well known to those of ordinary skill in the art, RSCD 86 and CNTLTMG 88 will not be described in further detail.

B.4 Trigger Control 38

The primary elements comprising Trigger Control 38 are shown in the lower right portion of FIG. 2 and include Trigger Enable Register (TRIGENR) 90, Trigger Memory (TRIGMEM) 92, Illegal/Error Condition Detector (ILGL/ER) 94, Trigger Detector Logic (TRIGDET) 96, Trigger Registers (TRIGREG) 98 and Time Stamp Counter (TSC) 100. As will be described below, the outputs from TRIGMEM 92, ILGL/ER 94 and the inputs from EXTTRG 42 are trigger signals representing the occurrence of conditions being monitored while TRIGENR 90 stores information, in the form of trigger enabling codes, determining what particular monitored conditions will result in a sampling trigger while. TRIGDET 96 and TRIGREG 98 compare the triggers representing the occurrence of conditions being monitored with the present and previous trigger condition inputs from TRIGENR 90 and generate a trigger output, TRIGS, when a set of monitored conditions match the criteria stored in TRIGENR 90.

B.4.1 TRIGENR 90

As shown, TRIGENR 90 has data inputs connected from CPUBUS 22 and receives and stores a set of programmably selectable trigger enable control codes, each of which represents a particular monitored condition or combination of monitored conditions which will result in a trigger output from TRIGDET 96 and TRIGREG 98, or a time sequential combination of triggers which will result in such a trigger output. As will be described, such a trigger output of TRIGDET 96 and TRIGREG 98 results in the sampling, and storage in the appropriate portion of Silo Bank 40, of the conditions then present on the selected sampling points in System 10. The trigger output may also cause an interrupt to be provided to CPU 28, and will determine which of the silo units comprising Silo Bank 40, SSL 50, PSL 52, or XSL 54, is to receive and store information.

The trigger enable control codes implemented in the present embodiment of TRIGENR 90 include 16 enabling codes that relate directly to 16 corresponding trigger inputs provided to TRIGDET 96 from the monitored points in System 10, and other codes which define, as trigger conditions, certain combinations or sequences of those 16 trigger conditions.

The trigger enable codes include 8 Trigger Enable Codes relating to conditions on SYSBUS 10. Each of these trigger enable codes (ENable TRiGger ?), ENTRGA through ENTRGH, correspond respectively to one of 8 Triggers, A through H, inclusive, each of which in turn corresponds to a programmably selectable combination of states on the 80 lines comprising the command, address and data bits of 80 bit SYSBUS 18.

Three enabling codes, ENTRGJ, ENTRGK and ENTRGL, likewise correspond to 3 Triggers J, K and L, which are devoted to error conditions and illegal conditions occurring on the buses of System 10 and to such conditions as a timeout condition of SYSBUS 18.

Another trigger enable code, ENTRGM, will cause the conditions present in System 10, in particular on SYSBUS 18 and PBUS 20, to be read into Silo Bank 40 on each SYSBUS 18 cycle.

There are 4 trigger enable codes (ENable eXternal TRigger ?), ENXTRD through ENTRXG, which correspond enable 4 external Triggers XD, XE, XF and XG, which are triggers from EXTTRG 42. These external triggers correspond to but are independent of the similarly designated internal Triggers D through G derived from the conditions on SYSBUS 18 and operate as an extension to the set of internal Triggers A through G by allowing one or more of Triggers XD through XG to be substituted for, used in place of, or use with the corresponding internal Triggers D through G.

Another set of trigger enable codes (TRigger ? IF ?), TRBIFA, TRICIFB, TRIGDIFC, TRIGEIFD, TRIGFIFE and TRIGIFF allow a user to define a trigger output dependent upon the sequential occurrence of one or more previous triggers of the group Trigger A through F, that is, to detect the occurrence of two to seven trigger conditions in a sequence. For example, if TRBIFA is set as true, then the condition causing Trigger B can be detected, and Trigger B generated, only if the condition causing Trigger A has already been detected and Trigger A generated.

TRIGENR 90 contains yet other enabling codes which control other aspects of Trigger Control 38.

B.4.2 Trigger Condition Inputs: EXTTRG 42, ILGL/ER 94

As shown, the trigger enable outputs of TRIGENR 90 are connected to a first set of inputs of TRIGDET 96. A second set of TRIGDET 96 inputs are connected from the outputs of TRIGMEM 92 and from ELGL/ER 94 and EXTTRG 42. This second set of inputs to TRIGDET 92 comprise the set of System 10 conditions which are monitored by Trigger Control 38. As described, some of this set of monitored condition inputs, such as those from EXTTRG 42, are connected directly from the trigger condition sources while others, such as the inputs from TRIGMEM 92 and ELGL/ER 94, are generated indirectly from the monitored conditions.

First considering the inputs from EXTTRG 42, these inputs are referred to as "external" in that they are from points outside of SYSBUS 18 and PBUS 20 and are connected directly from those points to TRIGDET 96 without further processing or logic operations being performed on these inputs. As described, these inputs to TRIGDET 96 comprise Triggers XD, XE, XF and XG and may be from, for example, points in Memory 16, CPU 28 or CSS 14 in general, various other system elements connected from SYSBUS 18, or even from points or devices external to System 10, such as peripheral devices or other systems, or any other points selected by the user of Bus Monitor 12.

The inputs of ILGL/ER 94 are connected from both SYSBUS 18 and PBUS 20 and from other devices and elements of System 10 which would be monitored in the normal course of such monitoring operations. These inputs are devoted, in particular, to error conditions occurring at these points in the system, and to detecting defined error conditions on SYSBUS 18 and PBUS 20. In the present implementation, ILGL/ER 94 is comprised of combinatorial logic embodied, for example, as a programmable logic array, which accepts these inputs and generates a set of triggers representing error conditions.

Two outputs of ILGL/ER 94, Triggers J and K, are generated from inputs connected from, respectively, the command and control lines of SYSBUS 18 and PBUS 20 and represents specific error conditions on SYSBUS 18 or PBUS 20, providing Trigger J or K when such a condition occurs. Examples of such bus error conditions may include command signals indicating the occurrence of multiple, incompatible responses on a bus, such as simultaneous acknowledge and not acknowledge signals, simultaneous not acknowledge and wait signals, simultaneous acknowledge and wait signals; the occurrence of improper timing conditions on a bus, such as a short response or disconnect condition; or the occurrence of a bus lock state while a bus command response is pending.

Finally, ILGL/ER 94 generates Trigger L to indicate timing errors in System 10, specifically in systems bus operations. The inputs generating Trigger L are connected from the various devices of System 10 which control system bus operations, for example, any of the devices having bus control capabilities for SYSBUS 18 or PBUS 20. Trigger L is generated as an output whenever a such device detects a timeout condition, that is, that a current bus operation has not completed within the normally allowed time.

Figure 3:
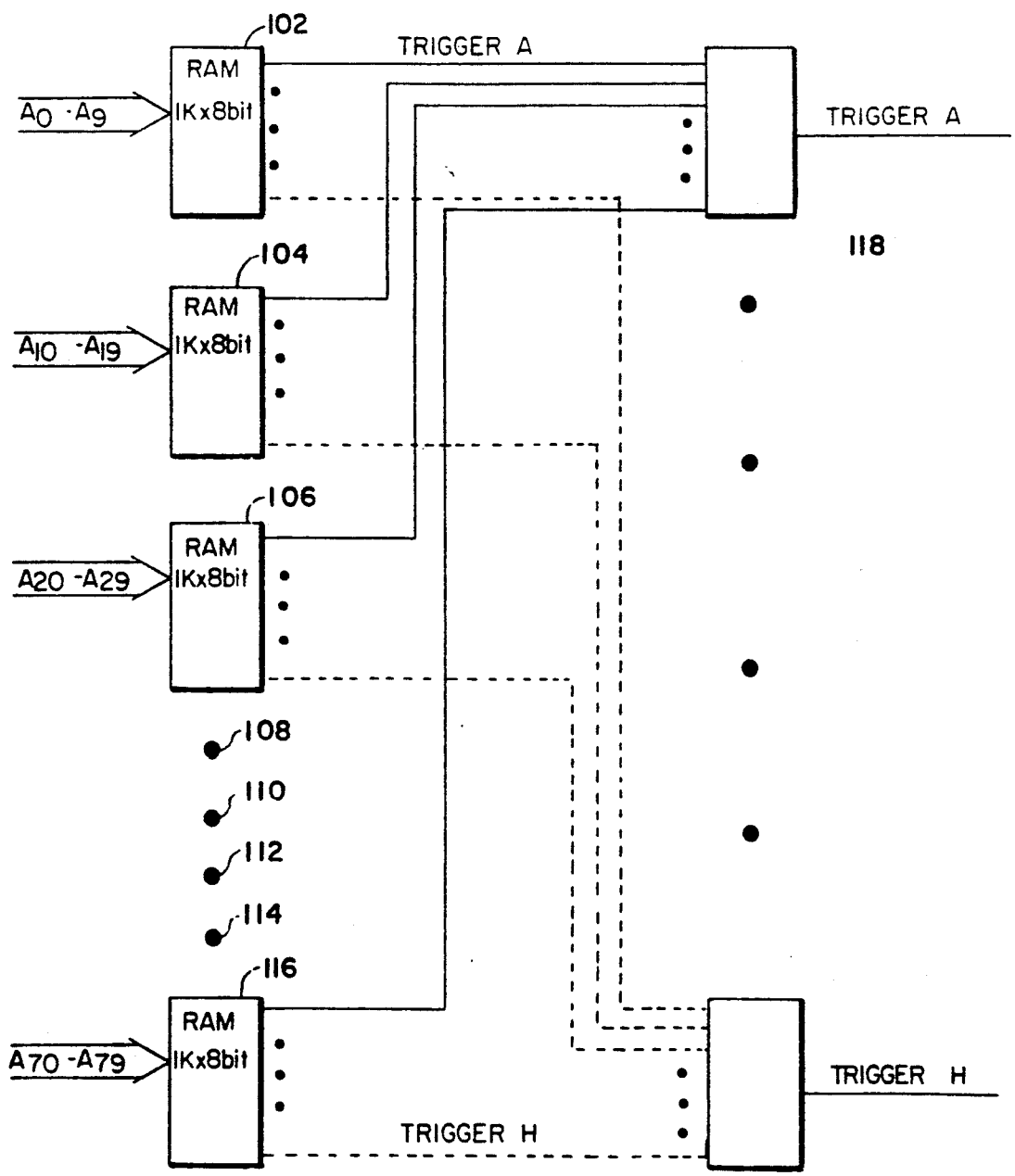
FIG. 3 is a block diagram of a trigger memory of the present invention.
Figure 4:
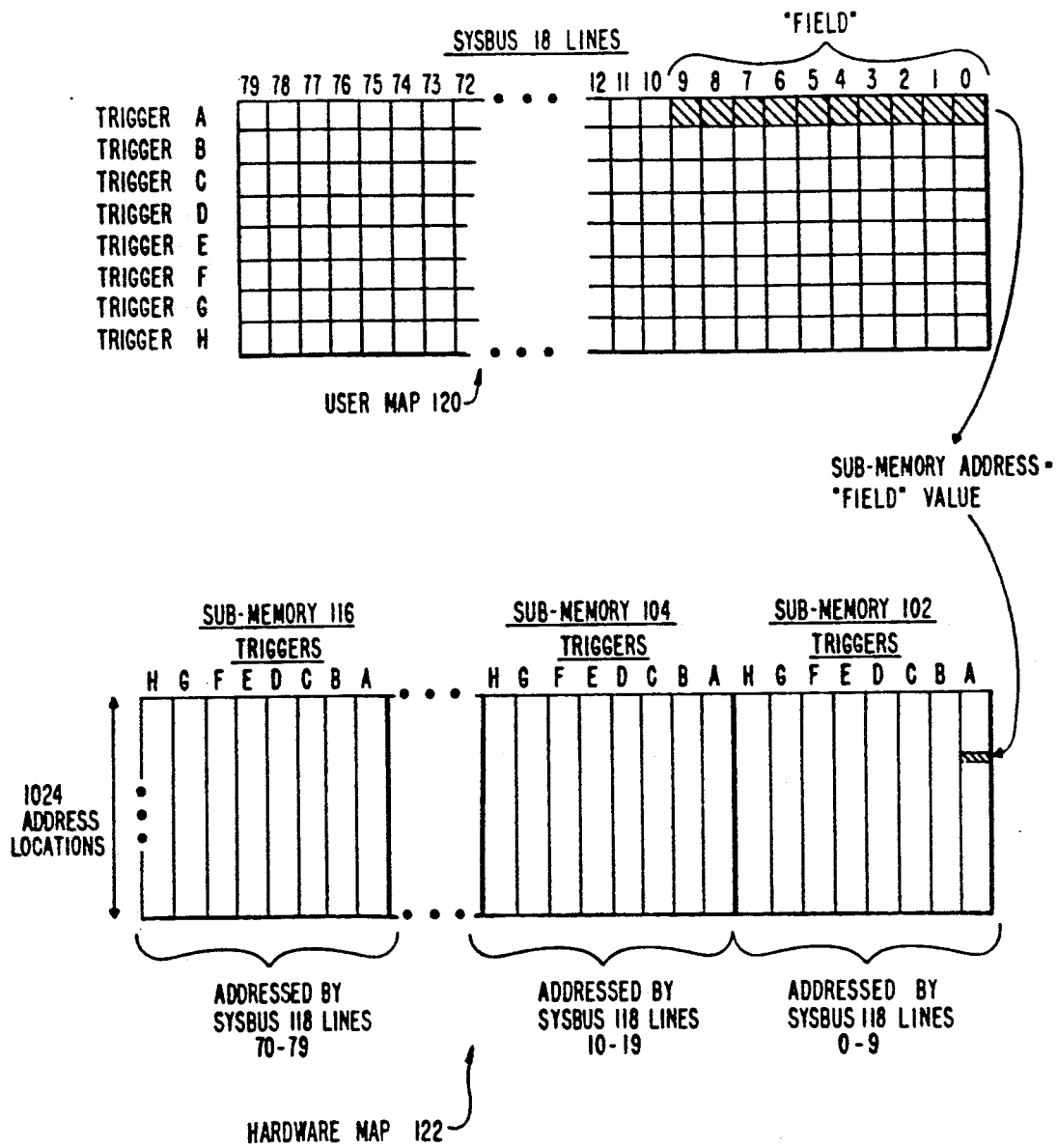
FIG. 4 is a diagrammatic representation of the generation and storing of trigger patterns in the trigger memory of the present invention.

B.4.3 Trigger Condition Inputs: TRIGMEM 92 (FIGS. 3 and 4)

Referring finally to TRIGMEM 92, as was described, the trigger enable codes provided from TRIGENR 90 include 8 codes, ENTRGA through ENTRGH, relating to conditions on SYSBUS 10. Each of these trigger enable codes corresponds respectively to one of 8 Triggers, A through H, inclusive, each of which in turn corresponds to a programmably selectable combination of states on the 80 lines comprising the command, address and data bits of 80 bit SYSBUS 18. These 8 Triggers A through H are provided from TRIGMEM 92 and are individually and programmably selectable.

As shown in FIG. 2, TRIGMEM 92 is a dual port memory. The first port of TRIGMEM 92 is comprised of a first address input, Condition Address Input (CA), and a the memory data input, Condition Data Input (CDI), which are both connected from CPUBUS 22. The second port of TRIGMEM 92 is comprised of a second address input, Trigger Address (TA), which is connected from the lines of SYSBUS 18, and the TRIGMEM 92 data output, Trigger Data Output (TDO), which is connected to trigger inputs of TRIGDET 96.

TRIGMEM 92 is functionally eight bits wide, with each bit corresponding to one of Triggers A through H, and stores patterns of Trigger bits A through H corresponding to the SYSBUS 18 conditions to be detected. Each such pattern of Trigger bits A through H occupies a TRIGMEM 18 location whose address corresponds to the particular combination of SYSBUS 18 bits representing the corresponding SYSBUS 18 condition to be detected. The presence on SYSBUS 18 of a condition which has been selected to be monitored will, because the signals present on the lines of SYSBUS 18 are connected to the second port address input TA of TRIGMEM 92, result in the addressing and reading from TRIGMEM 92 of the pattern of Triggers A through H which have been selected to correspond to that particular SYSBUS 18 condition.

The Trigger bit patterns are generated or provided from CSS 14 and are written into the appropriate TRIGMEM 92 address locations by CSS 14 acting through the first port of TRIGMEM 92, that is, through TRIGMEM 92's CA and CDI. These trigger patterns may, for example, be generated under control of software executing in CSS 14, or may be loaded from an outside source under control of CSS 14, or may be stored in CSS 14's EPROM 34 and selected from EPROM 34 and written into TRIGMEM 92 under control of CSS 14.

Thereafter, and while Bus Monitor 12 is monitoring the activities on SYSBUS 18, the bits present on the command, address and data lines of SYSBUS 18 are provided as read addresses to the address input of TRIGMEM 92's second port, that is, to TA. When the combination of bits present on the lines of SYSBUS 18 corresponds to a SYSBUS 18 condition to be detected, the pattern of Trigger bits A through H selected for that particular SYSBUS 18 condition, and stored in the TRIGMEM 92 address location corresponding to that combination of address input bits from SYSBUS 18, will be read from TRIGMEM 92 and to TRIGDET 96, thereby generating the selected ones of Triggers A through H.

As was previously described, SYSBUS 18 of the System 10 incorporating the present invention contains up to 80 lines. These 80 lines comprise 32 address bits, 7 miscellaneous bits used for various functions, 32 data bits, and 8 command bits.

TRIGMEM 92 of the present implementation is comprised of 8 8×1024 dual port Sub-Memories 102 through 116 and an 8 part AND Function 118 connected as shown in FIG. 3. As illustrated, the 80 address input lines from SYSBUS 18 are divided into 8 10-bit fields and the Trigger patterns are correspondingly divided into 8 8-bit sub-trigger fields wherein each sub-trigger field occupies one of Sub-Memories 102 through 116 and contains positions corresponding to each of Triggers A through H. TRIGMEM 92 detects the equivalence of a combination of bits on SYSBUS 18 with a trigger pattern stored in the 8 Sub-Memories 102-116 by associating each 10-bit address sub-field from SYSBUS 18 with a location in each of the 1024×8 submemories of TRIGMEM 92. The content of each such trigger sub-field location in Sub-Memories 102-116 will contain logic 1s in the appropriate Trigger positions if the SYSBUS 18 address sub-field corresponds to a SYSBUS 18 condition to be detected, or if the particular trigger subfield is determined to be a "don't care" condition. If all eight trigger sub-fields contain a logic 1 in the location addressed in the TRIGMEM 92 Sub-Memories 102-116, these 1s will be detected by the AND Function 118 and the appropriate ones of Triggers A through H provided to TRIGDET 96.

To illustrate, assume that TRIGMEM 92 is to provide Trigger A as an output when the condition

| (a) 00010000 | (b) 00000000 | (c) 10000000 | (d) 00000000 |
| (e) 11000000 | | | |
| (f) 00000000 | (g) 11111111 | (h) 00110000 | (i) 00000000 |
| (j) 11100011 | | | | occurs on SYSBUS 118 occurs. Ignoring the possibility of "don't care" states, the trigger pattern for this condition will then comprise:

(a) a 1 in Trigger A position at Sub-Memory address 00010000;

(b) a 1 in Trigger A position at Sub-Memory address 00000000;

(c) a 1 in Trigger A position at Sub-Memory address 10000000;

(d) a 1 in Trigger A position at Sub-Memory address 00000000;

(e) a 1 in Trigger A position at Sub-Memory address 11000000;

(f) a 1 in Trigger A position at Sub-Memory address 00000000;

(g) a 1 in Trigger A position at Sub-Memory address 11111111;

(h) a 1 in Trigger A position at Sub-Memory address 00110000;

(i) a 1 in Trigger A position at Sub-Memory address 00000000; and, (j) a 1 in Trigger A position at Sub-Memory address 11100011.

When the bits, or condition, expressed above appears on the 80 lines of SYSBUS 118, a logic 1 will appear at the Trigger A position outputs of all of Sub-Memories 102-116 and AND Function 118 will accordingly provide a Trigger A output from TRIGMEM 92.

The process by which a trigger pattern for one or more of Triggers A through H is generated and loaded into TRIGMEM 92 is illustrated in FIG. 4. As indicated, this process is comprised of two stages, which are executed by a software program executing, for example, on CSS 14. It is intended andenvisioned that the user should have the task and ability to intervene in this program only at the first step of the first stage, that is, in selecting which trigger is to be defined and in selecting the terms, or states of the lines of SYSBUS 18, which are to define the trigger. As the detailed steps in creating such a program will be well understood by those of skill in the art after the following description of the method, the program will not be described in further detail.

The first stage is the generation of a User Map 120 in which the conditions, or signals, present on each of SYSBUS 118's 80 lines are specified for each of Triggers A through H which are to be generated. This portion of the process is illustrated by the upper portion of FIG. 4, which represents a User Map 120. As shown, a User Map 120 contains 8 rows, one for each of Triggers A through H, and 80 columns, one for each of the lines of SYSBUS 18.

For each of Triggers A through H which are to be generated, the user first selects which trigger of Triggers A through H is being specified and then specifies the trigger condition for that trigger by defining a Boolean product function (an AND function) containing 1 to 80 terms wherein each term represents one of the 80 SYSBUS 18 signals that is to actively participate in generating the trigger. The user then assigns a state, logic 1 or logic 0, to each of the SYSBUS 18 signals, or lines, that is to define the trigger condition, depending upon whether the monitored condition requires that the signal on the corresponding line is to be a logic 1 or a logic 0. Signals not used in defining the trigger are assigned a "don't care" status. The addition of a "don't care" state to the trigger condition definitions, as well as logic 1 and logic 0 states, requires that the condition of each line, or signal, taking part in the definition of the trigger be defined by at least two bits.

These first steps are illustrated in the upper portion of FIG. 4, wherein a the definition of the SYSBUS 18 lines for portion of User Map 120 for a Trigger A has been represented by hatching.

In the second stage of the process, the User Map 120 is transformed into a Hardware Map 122, which represents the actual trigger patterns to be stored in TRIGMEM 92. As shown in the lower portion of FIG. 4, Hardware Map 122 is structured into 8 blocks, corresponding respectively to the 8 Sub-Memories 102-116 comprising TRIGMEM 92 and the corresponding 8 groups of ten SYSBUS 18 lines, each of which are connected to the second port address inputs of Sub-Memories 102-116, that is, to TA of TRIGMEM 92. Each block of Hardware Map 122 is comprised of 8 columns, each column corresponding, as indicated, to one of Triggers A through H, and into 1024 rows wherein each row corresponds to one of the Sub-Memory 102-116 address locations separately addressable by the 10 bit address inputs from the blocks of SYSBUS 18 lines.

The trigger patterns stored in Sub-Memories 102-116, that is, in the blocks of Hardware Map 122, are then generated by dividing each row of User Map 120 into eight 10 bit "fields", wherein each such "field" represents, for a given trigger, the Boolean combination of signals on a 10 line block of SYSBUS 18 that defines a part of the trigger condition for that trigger.

One such "field" is represented by hatching in User Map 120. Each such 10 bit "field" may assume 1024 different values, defining a corresponding 1024 different binary numbers, and each of these values is assigned, on a 1-to-1 basis, to a corresponding single bit location in the column of Hardware Map 122, the address of the single bit location corresponding to the "value" of the field. The location of any given "bit" in a column of Hardware Map 122 is thereby set to "1" if the binary address of its location in the column corresponds to value of a "field" from User Map 120. This mapping of triggers and trigger conditions from User Map 120 to trigger patterns in Hardware Map 122 is illustrated in FIG. 4 for a single 10 bit "field" from the specification of a trigger in User Map 120, showing how that field maps into a single address location in a single column one sub-memory block of Hardware Map 122.

The result of this process is that, for each trigger condition, that is, for each of Triggers A through H which have been defined by the user, there will be created a corresponding trigger pattern of one and zeros in the 8 columns of the 8 blocks of Hardware Map 122, one for each 10 bit "field" of User Map 120.

The resultant trigger pattern may then be written directly into TRIGMEM 92 or, more likely, will be stored in Memory 16 or RAM 30 of CSS 14 and written into TRIGMEM 92 before the monitoring operation begins. Also, as as described elsewhere herein, certain preselected and often used trigger patterns may be "permanently" stored in EPROM 34 of CSS 14 for use when selected by a user of Bus Monitor 12.

B.4.4 TRIGDET 96 and TRIGREG 98

In its most basic aspect, TRIGDET 96 is an AND/OR function which compares the triggers provided from EXTTRG 42, ILGL/ER 94 and TRIGMEM 92 with the trigger enable codes provided by TRIGENR 90 and provides a trigger output, TRIGS, whenever there is a concurrence of a SYSTEM 10 condition, as evidenced by a corresponding Trigger, and a trigger enable code. In this aspect, TRIGREG 98 is provided to latch and store the Triggers causing the TRIGS output so that, as previously described, the Trigger or Triggers causing TRIGS may be stored in Silo Bank 40, together with the sample data from the various sampling points in System 10.

In addition, however, and as described, certain Triggers may result from the time sequential occurrence of others of Triggers A through H and XD through XH. For this reason, TRIGREG 98 stores not only the Trigger or Triggers directly causing TRIGS, but the sequential occurrence of Triggers and provides this information back to TRIGDET 96. TRIGDET 96 will, in turn, generate a TRIGS upon the occurrence of a specified sequence of Triggers when such has been specified and enabled by the trigger enable codes.

In as much as the detailed design of and implementations of the logic necessary to perform the functions of TRIGDET 96 and TRIGREG 98, and the necessary operations performed by TRIGDET 96 and TRIGREG 98 are fully described and defined by the other portions of this description of Bus Monitor 12, such as the descriptions of TRIGENR 90 and the enabling codes stored therein and TRIGMEM 92 and the trigger patterns stored therein, TRIGDET 96 and TRIGREG 98 will not be described further herein.

B.4.6 Interrupt/Pattern Programmable Registers 48

As described above, the TRIGS output generated by TRIGDET 96 and TRIGREG 98 initiates the recording of data from SYSBUS 18, PBUS 20 and the sources of EXTTRG 42 into Silo Bank 40. In addition, and as previously described, Bus Monitor 12 includes a set of Interrupt/Pattern Programmable Registers (IPPR) 48 connected from CPUBUS 22 and to SYSBUS 18. As was described, IPPR 48 may be used by CSS 14 in a first mode to test SYSBUS 18 and system elements connected from SYSBUS 18 by allowing CSS 14 to write test patterns onto SYSBUS 18 through IPPR 48 under the control of CSS 14.

In the bus monitoring mode, CSS 14 may write selected commands into IPPR 40, such as a system or CPU interrupt command. These commands will reside in IPPR 40 until the occurrence of a TRIGS output from TRIGDET 96 and TRIGREG 98 and will be transferred onto SYSBUS 18 at that time. In the present implementation of Bus Monitor 12, this command is most usually a CPU 28 interrupt command that will suspend the operation then being executed by CPU 28.

This interrupt command appears on SYSBUS 18, and at the end of the SYSBUS 18 cycle, which is terminated by the command. The block of information stored in SSL 50 in association with the events related to the monitored condition causing the trigger will, in this case, begin with the trigger itself and the then present conditions on SYSBUS 18 that were sampled as a result of that trigger condition, such as the states present on the lines of SYSBUS 18 during that SYSBUS 18 cycle, and will conclude with the interrupt command as the final entry, the interrupt command having been the final set of conditions, or state, appearing on SYSBUS 18. In order to assist in correlating the data entries recorded in the three silo banks, SSL 50, PSL 52 and XSL 54, the interrupt command is also copied into the time stamp silo of PSL 52 and XSL 54, that is, into PTSL 66 and XTSL 70, if these silos are recording the event in which the interrupt command occurs.

B.4.7 Time Stamp

As was previously mentioned, Trigger Control 38 includes a Time Stamp Generator (TSG) 100 which is essentially a counter and which is initiated upon and by the occurrence of a TRIGS from TRIGDET 96 and TRIGREG 98. The count output of TRG 100 is written into SSL 50 at the start of each sampling operation after the occurrence of a trigger and is provided so that a user of Bus Monitor 12 may determine the relative times of occurrence of each trigger condition. The least significant bits of the count from TRG 100 are also written into PSL 52 and XSL 54, depending upon which of the portions of Silo Bank 40 are recording data in a given sampling operation of Bus Monitor 12, to aid in correlating the data stored in SSL 50, PSL 52 and XSL 54.

The recording of the time stamp count in SSL 50 and portions of the time stamp count in PSL 52 and XSL 54 is desirable because the writing of sampled data into the three subbanks of Silo Bank 40 are not correlated in themselves. That is, and for example, the various monitoring and sampling operations do not all result in data being written into all three portions of Silo Bank 40 in each operation, so that the blocks of information occupying similar address locations in the three subbanks of Silo Bank 40 are not necessarily from the same sampling operation. For example, if SYSBUS 18 is monitored for a condition which is of interest only with respect to SYSBUS 18, the occurrence of that condition would result in data being written only into SSL 50.

In addition, the blocks of data stored in the three subbanks of Silo Bank 40 in the sampling operations are not of equal size. For example, typical SYSBUS 18 operation which results in a trigger condition and the recording of SYSBUS 18 data in SSL 50, such as a SYSBUS 18 command for a data read from Memory 16, occupies only a single SYSBUS cycle and, accordingly, Bus Monitor 12 records only a single SYSBUS 18 cycle of data when a trigger arises from a SYSBUS 18 condition. The operations of PBUS 20 and certain operations reflected by the inputs from EXTTRG 42, however, may occupy more than one SYSBUS 18 cycle. For example, a command for a data read from Memory 16 may occupy only a single SYSBUS 18 cycle, but the actual read of the data from Memory 16 through PBUS 20 will occupy 8 consecutive PBUS 20 cycles, so that, if that particular operation results in a trigger condition and the recording of data into Silo Bank 40, Silo Bank 40 must record the data from one SYSBUS 18 cycle in SSL 50 and the data from 8 consecutive PBUS 20 cycles in PSL 52.

While the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. A monitoring means for use in a computer system for selectively detecting patterns of signals occurring at first selected points in the system and recording signals occurring at second selected points within the system during operation, comprising:

a trigger output means responsive to trigger signals for providing trigger outputs upon the occurrence of a trigger signal corresponding to a selected pattern of signals to be detected at the first selected points, a recording memory means connected from the second selected points and responsive to trigger outputs for recording the signals present at the second selected points, and a trigger generating means connected from the first selected points and responsive to the signals thereon for selectively generating the trigger signals, comprising:

a trigger memory means for storing patterns of trigger signals, each pattern of trigger signals corresponding to a selected condition to be detected on the first selected points, wherein the trigger memory means includes a first port having
a read address input connected from the first selected points, and
a data output connected to the trigger output means for providing patterns of trigger signals corresponding to the patterns of signals at the first selected points to be detected, wherein each pattern of trigger signals is stored in the trigger memory means at a location whose address corresponds to a pattern of trigger signals from the first selected points representing the corresponding condition to be detected.

2. The monitoring means of claim 1, wherein:

the trigger memory means is a dual port means having a second port with a write address input and a data input, and the system further comprises
a pattern source, means, including
a pattern memory means for storing and providing preselected patterns of trigger signals, and
an address generator means for generating write addresses for the trigger memory means and read addresses for the pattern memory means, wherein a read address input of the pattern memory means is connected from the address generator means and the pattern memory means is responsive to read addresses provided by the address generator means for reading the preselected patterns of trigger signals from the pattern memory means, and the write address input of the second port of the trigger memory means is connected from the address generator means and the data input of the second port of the trigger memory means is connected from the pattern memory means for receiving and storing the trigger patterns provided from the pattern source means.

3. The monitoring means of claim 1, wherein the first selected points comprise:

a plurality of signal lines of a bus of the system and the pattern of signals occurring on the signal lines of the bus represent operations occurring on the bus.

4. In a monitoring means for use in a computer system for selectively detecting patterns of signals occurring at first selected points in the system and recording signals occurring at second selected points within the system during operation, the monitoring means including a trigger output means responsive to trigger signals for providing trigger outputs upon the occurrence of a trigger signal corresponding to a selected trigger enabling code, a recording memory means connected from the second selected points and responsive to trigger outputs for recording the signals present at the second selected points, and a trigger generating means connected from the first selected points and responsive to the patterns of signals occurring thereon for selectively generating the trigger signals, including a dual port memory means for storing patterns of trigger signals, each pattern of trigger signals corresponding to a selected pattern of signals to be detected on the first selected points, wherein the dual port memory means includes a first port, including
a read address input connected from the first selected points, and
a data output connected to the trigger output means, and a second port, including a data input and a write address input, a method for generating patterns of trigger signals corresponding to the selected patterns of signals to be detected at the first selected points, comprising the steps of:

for each pattern of signals to be detected at the first selected points and which is to cause the generation of a trigger signal, generating a corresponding pattern of trigger signals,
through the second port of the trigger memory means, writing the pattern of trigger signals into the trigger memory means at the location whose address corresponds to a pattern of signals which is to be detected at the first selected points, providing read addresses to the read address input of the first port of the trigger memory means,
the read addresses comprising the patterns of signals from the first selected points which are to be detected, and
reading from the data output of the first port of the trigger memory means the trigger patterns located at the addresses corresponding to the selected patterns of signals which are to be detected from the first selected points, and
providing the trigger patterns to the trigger output means.

5. The method for generating patterns of trigger signals according to claim 4, further comprising the steps of:

generating a first trigger pattern map containing an entry row for each trigger signal to be generated, determining the selected patterns of signals from the first selected points whose occurrence is to be indicated by the trigger signal, representing the trigger condition for that trigger signal as a Boolean product function containing terms representing the states of the signals from the first selected points, assigning a state to each term of the Boolean function, wherein the states of the terms define the pattern of signals to be indicated by the trigger signal, and writing the states of the Boolean function for the trigger signal into the corresponding of the first map.

6. The method for generating patterns of trigger signals according to claim 5, wherein the trigger memory means is comprised of a plurality of submemory means, each submemory means for storing a portion of the trigger patterns, further comprising the steps of:

generating a second trigger pattern map wherein the second trigger pattern map contains a block for each submemory and each block contains a column for each trigger pattern, and for each trigger signal,
dividing the corresponding trigger pattern from the first map into fields wherein each field corresponds to a block of the second trigger pattern map and contains a portion of the corresponding trigger pattern, and for each field of the trigger pattern, determining a value of a binary number formed by the portion of the corresponding trigger pattern in the field and, in the block of the second trigger pattern map corresponds to the field and in the column of the second trigger pattern map corresponding to the trigger signal, writing a bit into the second trigger pattern map at the address location corresponding to the value of the binary number formed by the portion of the corresponding trigger in the field, and writing the trigger patterns of the blocks and columns of the second trigger pattern map into the corresponding locations in the submemories of the trigger memory means.

* * * * *